US009548607B2

(12) United States Patent
Meiri et al.

(10) Patent No.: US 9,548,607 B2
(45) Date of Patent: Jan. 17, 2017

(54) SYSTEM AND METHOD FOR MONITORING AND CONTROLLING ELECTRICAL NETWORK

(71) Applicants: Oren Meiri, Moshav Gan Yoshaia (IL); Yuval Shmidov, Zoran-Kadima (IL)

(72) Inventors: Oren Meiri, Moshav Gan Yoshaia (IL); Yuval Shmidov, Zoran-Kadima (IL)

( * ) Notice: Subject to any disclaimer, the term of this patent is extended or adjusted under 35 U.S.C. 154(b) by 231 days.

(21) Appl. No.: 14/447,749

(22) Filed: Jul. 31, 2014

(65) Prior Publication Data
US 2016/0036214 A1    Feb. 4, 2016

(51) Int. Cl.
*H02H 7/00*    (2006.01)
*H02H 7/26*    (2006.01)

(52) U.S. Cl.
CPC .................................. *H02H 7/263* (2013.01)

(58) Field of Classification Search
CPC ...................................................... H02H 7/263
USPC ............................................................ 361/63
See application file for complete search history.

(56) References Cited

U.S. PATENT DOCUMENTS

| 6,195,243 | B1* | 2/2001 | Spencer | H02H 3/00 361/64 |
| 6,313,641 | B1* | 11/2001 | Brooks | G01R 31/025 324/424 |
| 6,751,562 | B1* | 6/2004 | Blackett | G05B 19/4185 340/635 |
| 7,769,497 | B2* | 8/2010 | Patel | H02J 3/06 307/20 |

\* cited by examiner

*Primary Examiner* — Stephen W Jackson
(74) *Attorney, Agent, or Firm* — Pearl Cohen Zedek; Latzer Baratz LLP

(57) ABSTRACT

A system and method for monitoring and controlling an electrical network includes a plurality of peripheral units installed at various nodes along the branches of the electrical network, each peripheral unit including current meters and voltage meters to measure current of a phase wire, current of the neutral wire, current of the ground wire, current difference between a phase wire and the neutral wire, voltage between a phase wire and the neutral wire and voltage between the neutral wire and the ground wire; switches connected to the phase wires and the neutral wires; and a central processing unit configured to: collect data from the meters, analyze the data to detect faults at the electrical network, and control the switches of the plurality of peripheral units, so as to disconnect faulty branches of the electrical network.

16 Claims, 7 Drawing Sheets

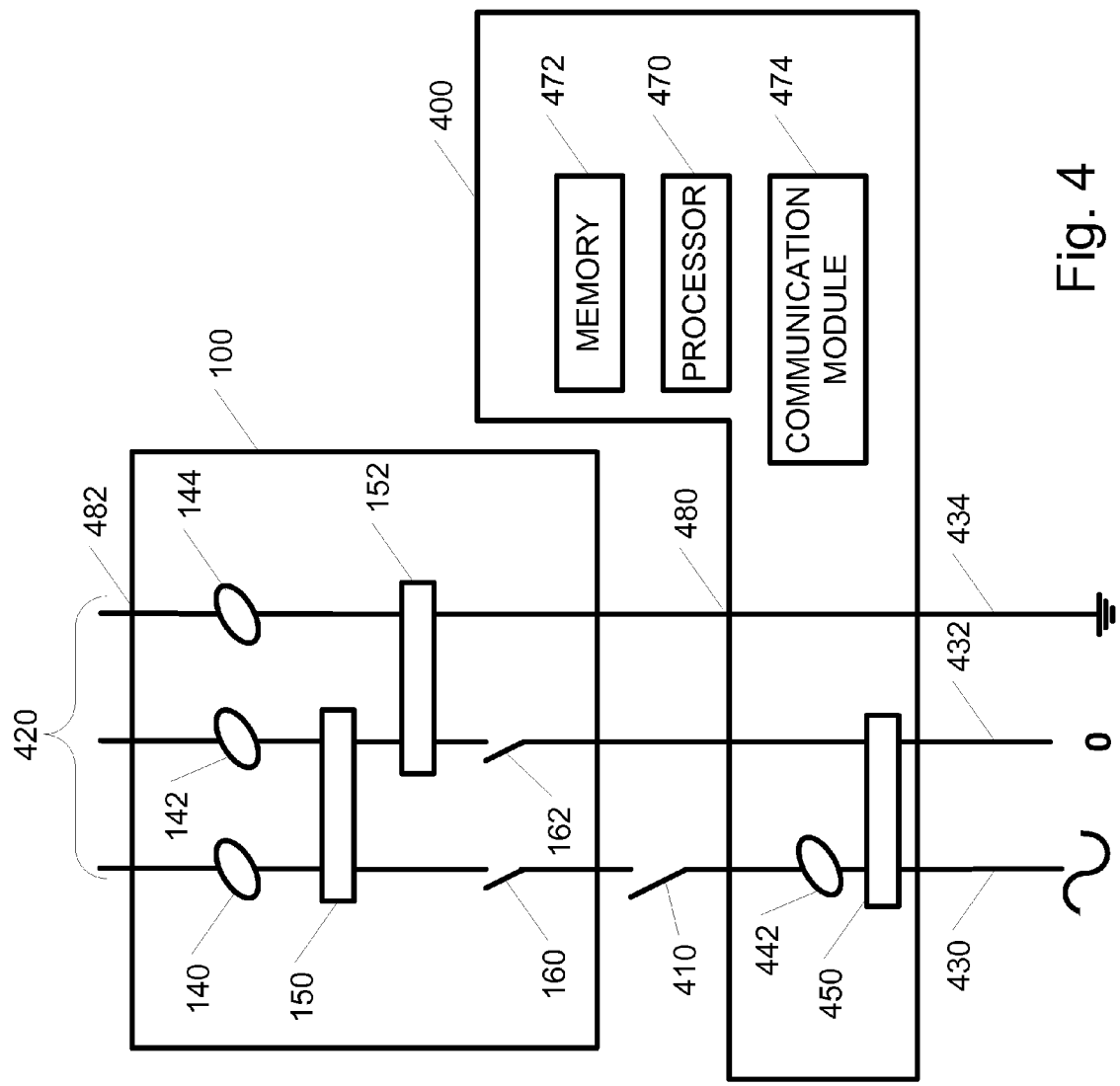

SYSTEM AND METHOD FOR MONITORING AND CONTROLLING ELECTRICAL NETWORK

BACKGROUND OF THE INVENTION

Typical electrical networks include safety means such as circuit breakers for detection and interruption of short circuits and a residual-current device (RCD) for detection of leakage currents and interruption of power supply to that circuit. Both the circuit breakers and the RCD disconnect a specific circuit or all of the electrical system in case of a fault. However, these devices are typically installed at a central location e.g., at the main board, and are each connected to a whole circuit that may include a plurality of branches that may reach various devices and outlets located at a physical distance from the main board and from one another. Thus, it may be very difficult to locate the faulty branch of the circuit.

SUMMARY OF THE INVENTION

According to some embodiments of the present invention, there is provided a system for monitoring and controlling an electrical network, the electrical network may include branches, each branch comprising at least one phase wire, a neutral wire and a ground wire, and plurality of nodes, the system may include: a plurality of peripheral units installed at various nodes along the branches of the electrical network, the peripheral units may include: at least one meter selected from a current meter and a voltage meter, to measure at least one of: current of a phase wire, current of the neutral wire, current of the ground wire, current difference between a phase wire and the neutral wire, voltage between a phase wire and the neutral wire and voltage between the neutral wire and the ground wire; at least one switch connected to at least one of: the phase wires and the neutral wires of at least one branch; and a central processing unit to: collect data from the at least one meter; analyze the data to detect faults at the electrical network; and control the at least one switch of the plurality of peripheral units, so as to disconnect faulty branches of the electrical network.

Furthermore, according to some embodiments of the present invention, the current meter may be a Hall Effect current meter.

Furthermore, according to some embodiments of the present invention, the branch may be a single phase line including a phase wire, a neutral wire and a ground wire, and wherein each of the peripheral units may include: three current meters to measure the currents flowing at the phase wire, the neutral wire and the ground wire; two voltage meters to measure the voltage between the phase wire and the neutral wire and between the neutral wire and the ground wire; and two switches, one installed at the phase wire and one at the neutral wire.

Furthermore, according to some embodiments of the present invention, the branch may be a single phase line including a phase wire, a neutral wire and a ground wire, and wherein each of the peripheral units may include: a differential current meter to measure the difference between current flowing at the phase wire and the neutral wire; a current meter to measure the current flowing at the ground wire; two voltage meters to measure the voltage between the phase wire and the neutral wire and between the neutral wire and the ground wire; and two switches, one installed at the phase wire and one at the neutral wire.

Furthermore, according to some embodiments of the present invention, the branch may be a three phase line may include three phase wires, a neutral wire and a ground wire, and wherein each of the peripheral units may include: five current meters to measure the currents flowing at the phase wires, the neutral wire and the ground wire; four voltage meters to measure the voltage between each of the phase wires and the neutral wire and between the neutral wire and the ground wire; and four switches, one installed at each of the phase wires and one on the neutral wire.

Furthermore, according to some embodiments of the present invention, the peripheral units may be installed at locations selected from splitting nodes of the electrical network, branches of the electrical network and at end nodes of the electrical network.

Furthermore, according to some embodiments of the present invention, a first peripheral unit may be installed at one end of a branch of the electrical network and a second peripheral unit may be installed at a second end of the branch, and discontinuity in the branch may be detected if a voltage measured by the second peripheral unit is substantially null and a voltage measured by the first peripheral unit substantially equals mains voltage.

Furthermore, according to some embodiments of the present invention, the branch may be switched, and a third peripheral unit may be installed between the branch switch and an appliance which is fed by the branch, the third peripheral unit may include at least one of a current meter to measure a current between the branch switch and the appliance and a voltage meter to measure a voltage between a phase wire and a neutral wire of the branch between the branch switch and the appliance, and discontinuity in the branch is detected if the voltage measured by the second peripheral unit is substantially null and the voltage measured by the first peripheral unit is substantially mains voltage, and at least one of the voltage and current measured by the third peripheral unit indicates that the branch switch is in close position.

Furthermore, according to some embodiments of the present invention, a first peripheral unit may be installed at one end of a branch of the electrical network and a second peripheral unit may be installed at a second end of the branch. The first peripheral unit may include at least one of: a voltage source and a current source, to generate current flow at the ground wire of the branch, and the second peripheral unit may measure the current at the ground wire of the branch, and the resistance of the ground wire may be calculated based on the measured current.

Furthermore, according to some embodiments of the present invention, the peripheral unit may include current meters to measure currents of each of the phase wires, the neutral wire and the ground wire, and leakage currents may be calculated based on the differences between the currents measured at the phase wires and the currents measured at the neutral wire.

Furthermore, according to some embodiments of the present invention, the peripheral unit may include differential current meters to measure current differences between each of the phase wires and the neutral wire, and leakage currents may be calculated based on the current differences.

Furthermore, according to some embodiments of the present invention, quality of insulation of wires of the branch may be estimated based on the calculated leakage currents.

Furthermore, according to some embodiments of the present invention, the peripheral unit may include current meters to measure currents of each of the phase wires, the neutral wire and the ground wire, and short circuit may be detected if the current measured at one of the phase wires and at the ground wire exceeds a predetermined threshold.

Furthermore, according to some embodiments of the present invention, the peripheral unit may include voltage meters to measure the voltage between each of the phase wires and the neutral wire and between the neutral wire and the ground wire, and loose connections may be detected based on the measured voltages.

Furthermore, according to some embodiments of the present invention, each of the peripheral units may include a communication module, and the central processing unit may be configured to communicate with the peripheral units via the communication modules.

Furthermore, according to some embodiments of the present invention, the central processing unit may be configured to communicate with the peripheral unit via at least one of a wired communication network, wireless communication network and power-line communication network.

Furthermore, according to some embodiments of the present invention, the peripheral unit may include current meters to measure currents of each of the phase wires, and the system gives an overload indication if current in at least one of the phase wires exceeds a predetermined threshold.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 is a high-level diagram of an exemplary single phase peripheral unit of switched branch according to some embodiments of the present invention;

Figure 1:
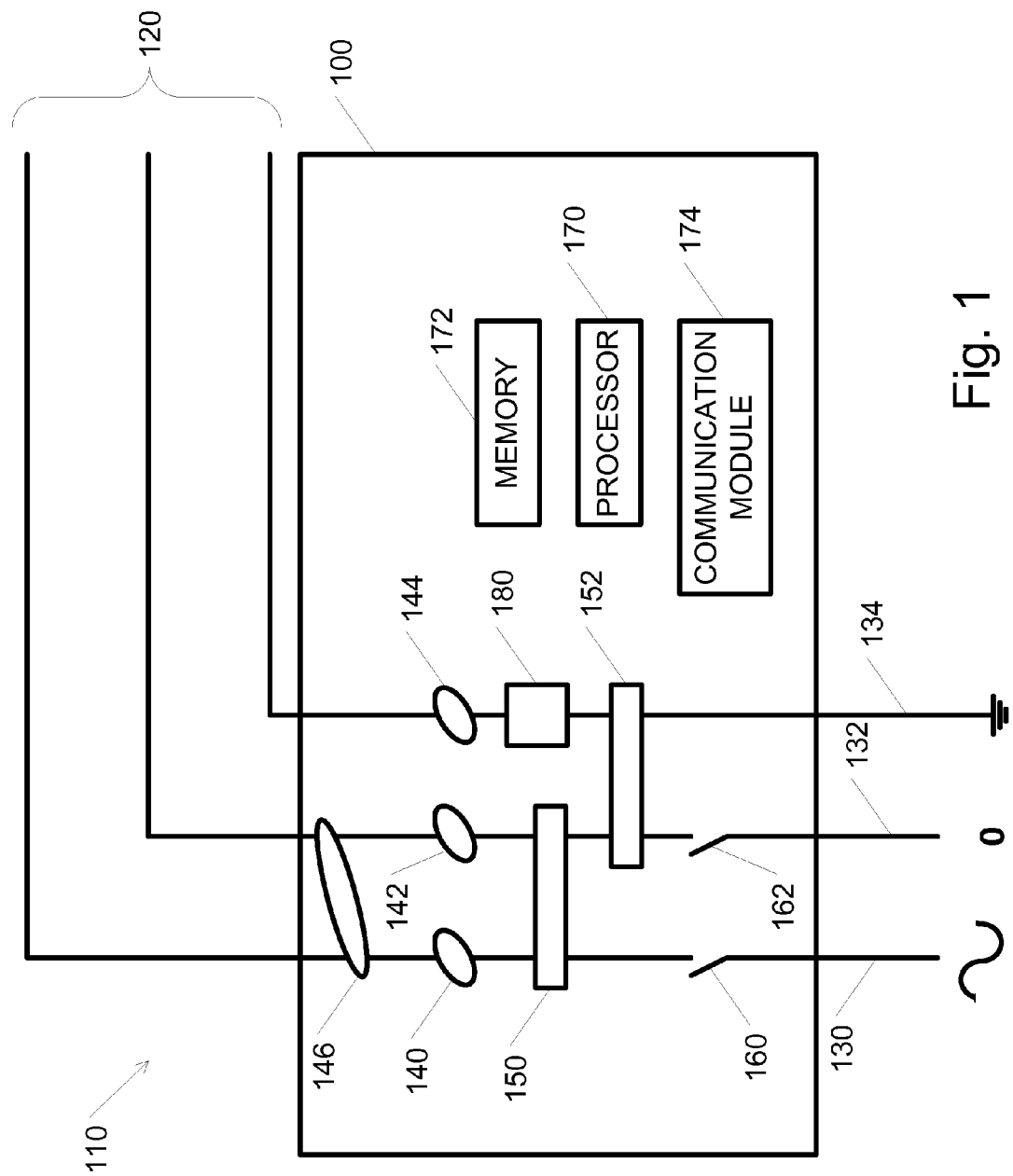
FIG. 1 is a high-level diagram of an exemplary single phase peripheral unit according to some embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although some embodiments of the present invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although some embodiments of the present invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

An electrical network may include a plurality of branches, each branch typically including one or three phase wires, a neutral wire and a ground wire, and plurality of nodes. According to some embodiments of the present invention, a system for monitoring and controlling an electrical network may include a plurality of peripheral units installed at various nodes along the branches of the electrical network. Each of the peripheral units may include at least one meter selected from a current meter and a voltage meter, to measure at least one of: current of a phase wire, current of the neutral wire, current of the ground wire, voltage between a phase wire and the neutral wire and voltage between the neutral wire and the ground wire, and at least one switch connected to at least one of: the phase wires and the neutral wire of at least one branch, and a central processing unit configured to: collect data from the at least one meter, analyze the data to detect faults at the electrical network, and control the at least one switch of the plurality of peripheral units, so as to disconnect faulty branches of the electrical network.

Reference is made to FIG. 1 which is a high-level diagram of an exemplary single phase peripheral unit 100 according to some embodiments of the present invention. Peripheral unit 100 may be installed at a node 110 of a branch 120 of an electrical system. Branch 120 may be a single phase line including a phase wire 130, a neutral wire 132 and a ground wire 134. According to some embodiments of the present invention, peripheral unit 100 may include current meters 140, 142, 144, for measuring the currents of phase wire 130, neutral wire 132 and ground wire 134, respectively. Peripheral unit 100 may include a differential current mater 146 for measuring current difference between phase wire 130 and neutral wire 132. Differential current mater 146 may be added to current meters 140, 142 or instead of current meters 140, 142. Peripheral unit 100 may further include voltage meter 150 for measuring the voltage between phase wire 130 and neutral wire 132, and voltage meter 152 for measuring the voltage between neutral wire 132 and ground wire 134. Peripheral unit 100 may further include switches 160, 162 connected to phase wire 130 and neutral wire 132, respectively. Peripheral unit 100 may include source 180 which may be any of a voltage source and/or a current source, configured to generate current flow at ground wire 134 of branch 120. It should be noted that a single phase peripheral unit according to some embodiments of the present invention may include partial version of peripheral unit 100. For example, a peripheral unit according to some embodiments of the present invention may include some or all of meters 140, 142, 144, 150, 152 switches 160, 162 and source 180.

Peripheral unit 100 may send data collected by meters 140, 142, 144, 150, 152 to a central processing unit (for example, central processing unit 510 shown in FIG. 5), and may receive control commands to switches 160, 162 from the central processing unit, for example, to switch switches 160, 162 to "off" state in case a fault is detected.

Peripheral unit 100 may include processor 170 and memory unit 172. Processor 170 may be configured to execute commands included in a program, algorithm or code stored in memory 172. Processor 170 may include components such as, but not limited to, one or more central processing units (CPU) or any other suitable multi-purpose or specific processors or controllers, one or more input units, one or more output units or any other suitable hardware components and/or software components. Processor 170 may be any computation device that is configured to execute various operations included in some methods disclosed herein. Memory 172 may be a non-transitory computer-readable storage medium that may store thereon instructions that when executed by processor 170, cause processor 170 to perform operations and/or methods, for example, the method disclosed herein.

Processor 170 may be configured to collect data from meters 140, 142, 144, 150, 152 and send the data to the central processing unit using communication module 174. The central processing unit may send control commands to switches 160 and 162 via communication module 174. Communication module 174 may communicate with the central processing unit via a communication network (not shown). The communication network may be or may include at least one of a wired communication network, wireless communication network and power-line communication network. Thus, communication module 174 may be configured to transmit and receive data over a selected network or networks, according to the system design.

Figure 2:
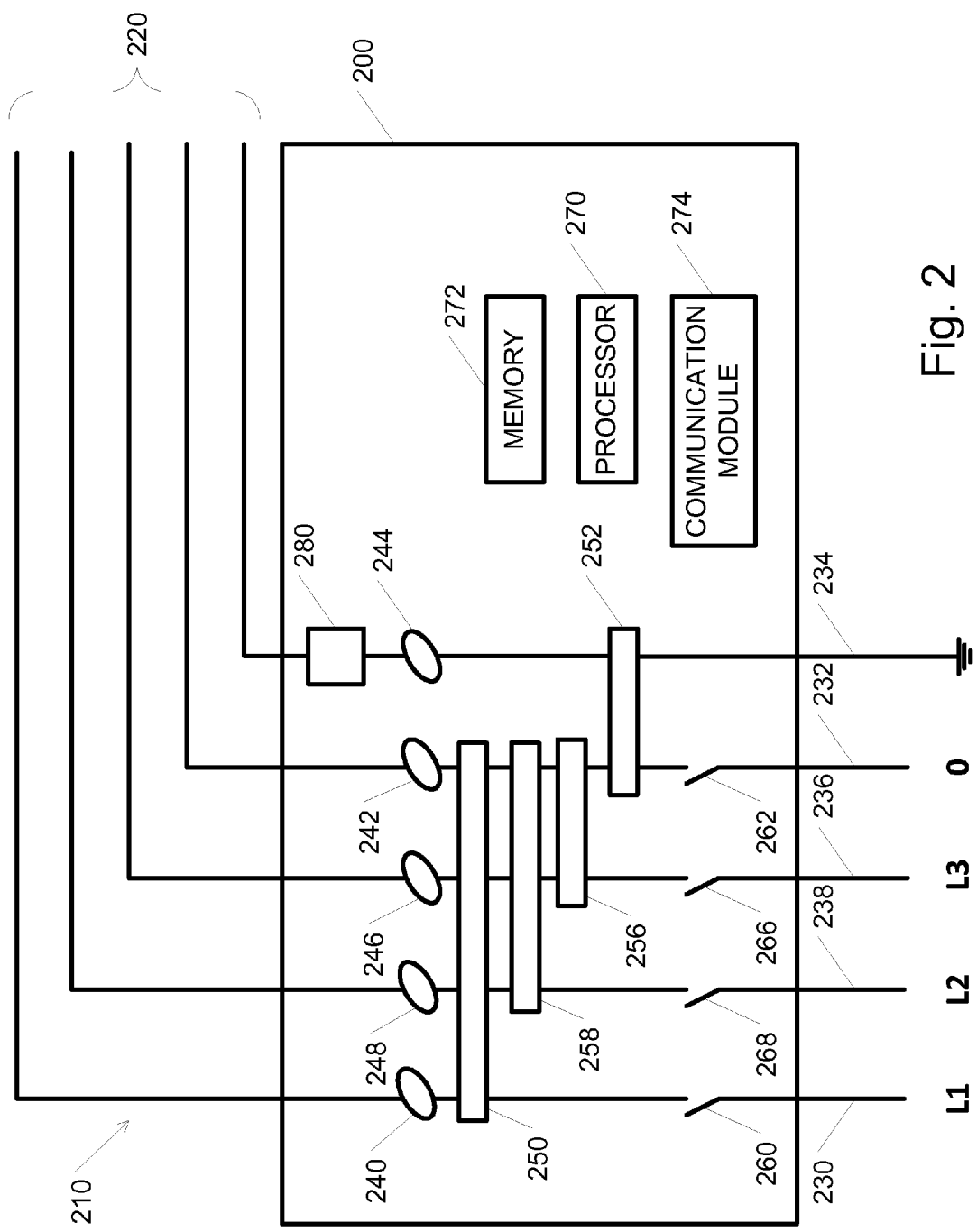
FIG. 2 is a high-level diagram of an exemplary three phase peripheral unit according to some embodiments of the present invention.

Reference is made to FIG. 2 which is a high-level diagram of an exemplary three phase peripheral unit 200 according to some embodiments of the present invention. Peripheral unit 200 may be installed at a node 210 of a branch 220 of an electrical system. Branch 220 may be a three phase line including three phase wires 230, 238, 236, a neutral wire 232 and a ground wire 234. According to some embodiments of the present invention, peripheral unit 200 may include current meters 240, 248, 246, 242, 244 for measuring the currents of phase wires 230, 238, 236, neutral wire 232 and ground wire 234, respectively. Peripheral unit 200 may further include voltage meter 250 for measuring the voltage between phase wire 230 and neutral wire 232, voltage meter 258 for measuring the voltage between phase wire 238 and neutral wire 232, voltage meter 256 for measuring the voltage between phase wire 236 and neutral wire 232, and voltage meter 252 for measuring the voltage between neutral wire 232 and ground wire 234. Peripheral unit 100 may further include switches 260, 268, 266, 262 connected to phase wires 230, 238, 236 and neutral wire 232, respectively. Peripheral unit 200 may include source 280 which may be any of a voltage source and a current source, configured to generate current flow at ground wire 234 of branch 220. It should be noted that a three phase peripheral unit according to some embodiments of the present invention may include partial version of peripheral unit 200. For example, a three phase peripheral unit according to some embodiments of the present invention may include some or all of meters 240, 248, 246, 242, 244, 250, 258, 256, 252 switches 260, 268, 266, 262 and source 280.

Peripheral unit 200 may send data collected by meters 240, 248, 246, 242, 244, 250, 258, 256 and 252 to a central processing unit (for example, central processing unit 510 shown in FIG. 5), and may receive control commands to switches 260, 268, 266, 262 from the central processing unit, for example, to disconnect lines 230, 238, 236 and 232 by driving switches 260, 268, 266, 262, respectively, to their "off" state in case a fault is detected.

Processor 270, memory unit 272 and communication module 274 may be similar in structure to processor 170, memory unit 172 and communication module 174 of peripheral unit 100 depicted in FIG. 1. Processor 270 may be configured to collect data from meters 240, 248, 246, 242, 244, 250, 258, 256, 252 and send the data to the central processing unit using communication module 274. The central processing unit may send control commands to switches 260, 268, 266, 262 via communication module 274.

Current meters used by peripheral units according to some embodiments of the present invention, such as current meters 140, 142, 144, 240, 248, 246, 242, 244 may be for example, Hall Effect current meters, with accuracy/resolution of at least 0.05 Amperes. However, other current meters with better or worse accuracy may be used.

Figure 3A:
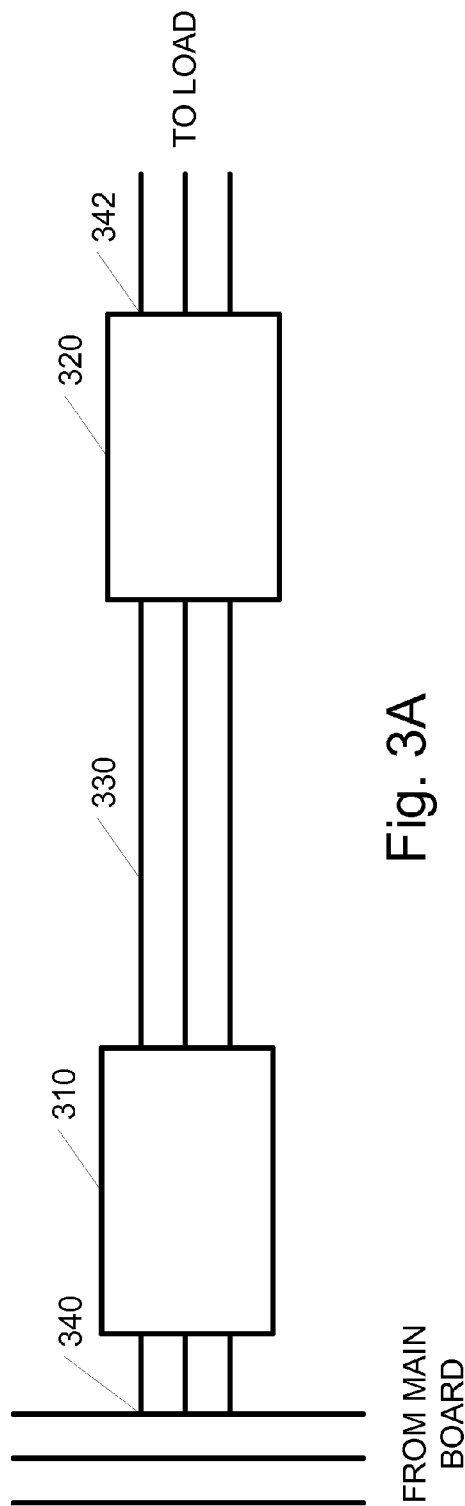
FIG. 3A is a high-level diagram of an exemplary single phase branch of an electrical system according to some embodiments of the present invention.

Reference is made to FIG. 3A which is a high-level diagram of an exemplary single phase branch 330 of an electrical system according to some embodiments of the present invention. Single phase peripheral units 310 and 320 may be installed at two different nodes along branch 330. For example, peripheral unit 310 may be installed at or right after splitting node 340 of the electrical network and peripheral unit 320 may be installed at end node 342 of the electrical network. As used herein, a splitting node may refer to points of the electrical network in which branches split and end nodes may refer to points of the electrical network that are physically close to the loads, to electrical switches or to inlets. Peripheral units 310 and 320 may be generally similar to peripheral unit 100 depicted in FIG. 1. It should be readily understood that peripheral units may be installed at nodes along branches, for example, along branch 330, dividing it to two branches, and improving the resolution of the system's analysis capability, as demonstrated in FIG. 3C.

In the configuration of FIG. 3A, discontinuity in branch 330 may be detected if a voltage between the phase wire and the neutral wire of branch 330 measured by peripheral unit 320 is substantially null and a voltage between the phase wire and the neutral wire of branch 330 measured by peripheral unit 310 substantially equals mains voltage. Continuous measurement of these voltages may enable detection, or raise suspicion of loose connections at branch 330, since loose connections tend to cause irregular voltages.

Detecting loose connection may help preventing fire events since loose connections may lead to overheating and eventually to fire if not fixed.

If one of the peripheral units installed on branch 330 includes source 180 configured to generate current flow at the ground wire of branch 330, for example, peripheral unit 310, then the second peripheral unit, for example, peripheral unit 320, may measure the current at the ground wire of branch 330. The resistance of the ground wire may be calculated based on the measured current. For example, source 180 may generate current flow by generating an Alternate Current (AC) voltage of 5V, continuously or intermittently, with or without interruption of the mains supply.

According to some embodiments of the present invention, leakage currents may be calculated based on the differences between the current measured at the phase wire of branch 330 and the current measured at the neutral wire of branch 330 at either peripheral unit 310 and/or 320. If there are no leakage currents, it is expected that the difference between the current measured at the phase wire of branch 330 and the current measured at the neutral wire of branch 330 would equal zero. If, for example, the current measured at the phase wire of branch 330 is higher than the current measured at the neutral wire of branch 330, the difference may equal the leakage current. The current at the ground wire may be measured concurrently. Thus, it may be determined, based on the measured ground current, whether current leaks to the ground wire (this may also be interpreted as short circuit as discussed below). Additionally, the quality of insulation of wires of branch 330 may be estimated based on the calculated leakage currents. The difference between the at the phase wire of branch 330 and at the neutral wire of branch 330 may be measured by a single differential current meter such as differential current meter 146. Measuring the current at the phase wire of branch 330 may also give indication of overload if the current is above a predetermined threshold.

Additionally, the location of the fault that causes current to leak may be estimated based on the current measurement at both peripheral units. For example if there is no current difference between the phase wire and the neutral wire measured at peripheral unit 310, but there is a current difference between the phase wire and the neutral wire measured at peripheral unit 320, it may be determined that current leaks somewhere along branch 330.

According to some embodiments of the present invention, short circuit may be detected if the current measured at the phase wire and at the neutral wire or ground wire of branch 330 exceeds a predetermined threshold and/or its rise pattern (e.g.. time derivative) exceeds a predetermined second threshold. The response time of a typical circuit breaker to short is derived from the response time its electromechanical trip unit which will be typically longer than the response time derived from the sensitivity of current meters typically used by some embodiments of the present invention. Thus, a short circuit may be detected by the peripheral units of the present invention prior to detection of short circuit by the circuit breaker. Additionally, characteristics of the current measured by peripheral units 310, 312 prior to disconnection of the circuit may be recorded and analyzed in order to get an estimation of the location of the fault that caused the short circuit. For example, if just prior to disconnection of branch 330, the current measured by peripheral unit 310 at the phase wire and at the neutral or ground wire exceeds a predetermined threshold, and the current measured by peripheral unit 320 at the phase wire and at the neutral wire is relatively low, it may be estimated that the fault is somewhere along branch 330, between peripheral unit 310 and peripheral unit 312. Additionally, if the current rise is measured at the phase wire and at the neutral wire, it may be determined that the short circuit is between the phase wire and the neutral wire, while if the current rise is measured at the phase wire and at the ground wire, it may be determined that the short circuit is between the phase wire and the ground wire.

Additionally short circuit may be detected if the current measured at the phase wire does not equal the current measured at the neutral wire, or when the difference between the current measured at the phase wire and the current measured at the neutral wire exceeds a predetermined threshold. The difference between the current measured at the phase wire and the current measured at the neutral wire may be measured by differential current meter 146 or by subtracting the current measured by current meter 142, from the current measured by current meter 140. If the ground current is also measured, it may be determined whether the short (or leakage) circuit is between the phase or neutral wires and the ground wire, or between the phase or neutral wires and the ground (this may also be interpreted as leakage current).

Figure 3B:
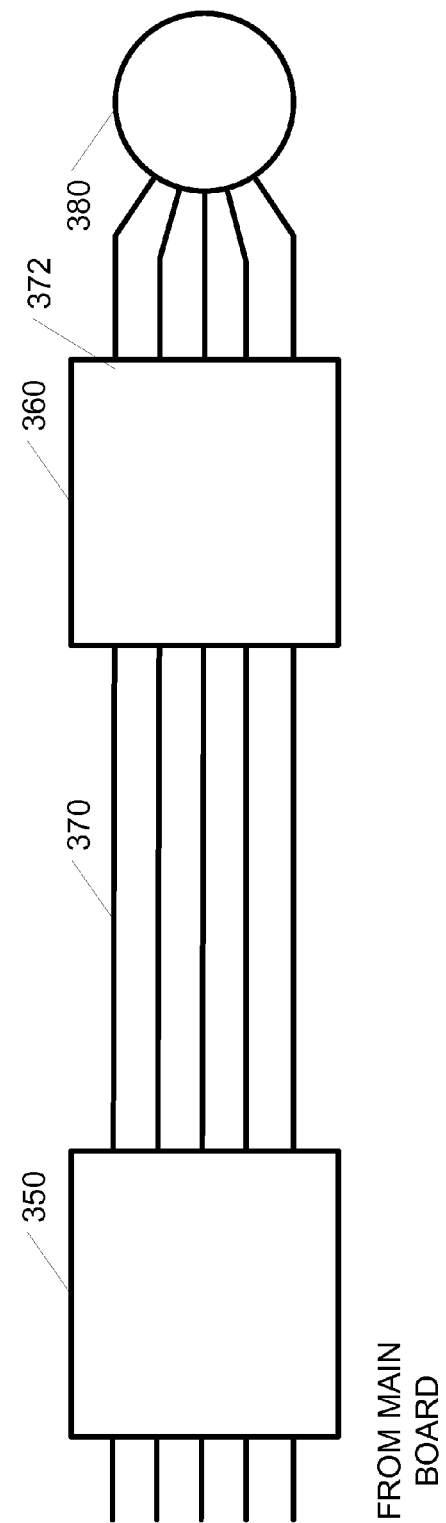
FIG. 3B is a high-level diagram of an exemplary three phase branch of an electrical system according to some embodiments of the present invention.

Reference is made to FIG. 3B which is a high-level diagram of an exemplary three phase branch 370 of an electrical system according to some embodiments of the present invention. Three phase peripheral units 350 and 360 may be installed at two different nodes along branch 370. For example, peripheral unit 350 may be installed at close physical proximity to the electrical board of the electrical network and peripheral unit 360 may be installed at end node 372 of the electrical network, which may be close to load 380. Peripheral units 350 and 360 may be generally similar to peripheral unit 200 depicted in FIG. 2.

The principles of detecting discontinuity, loose connections, resistance of the ground wire, leakage currents, overload and short currents are similar to the single phase case, with he required changes. Additionally, analysis of the voltages measured between all three phase wires and the neutral wire may give indication of the order of the phases. Thus, if the order of phases at a certain load counts, faulty connection of phases may be detected and an indication of incorrect order may be given.

Figure 3C:
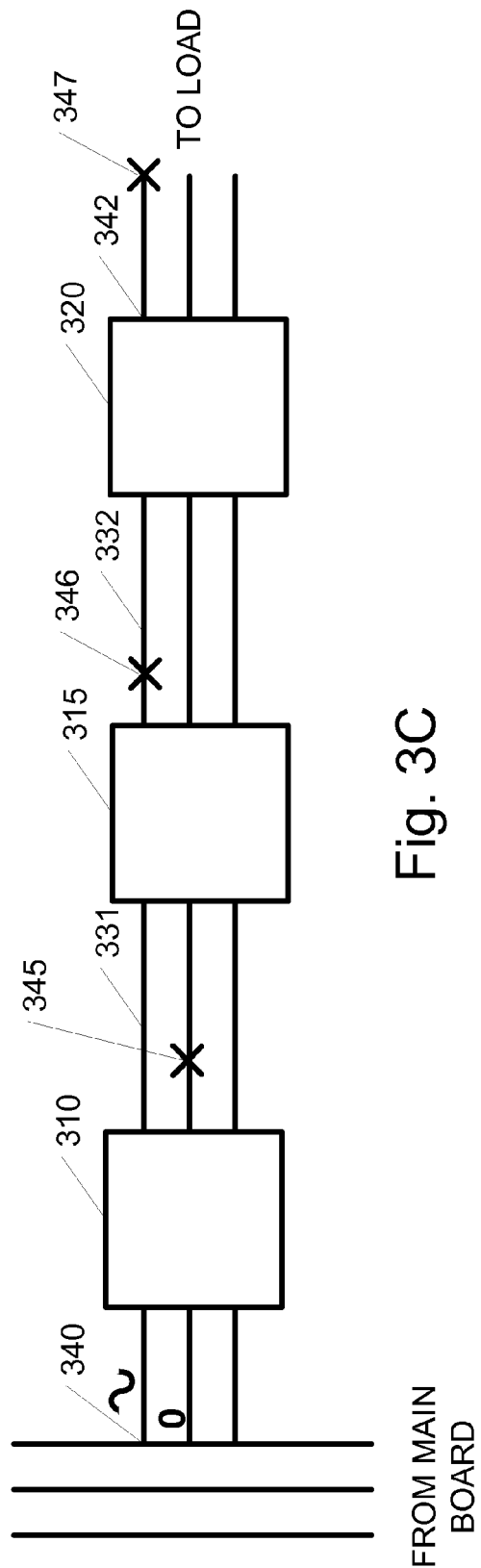
FIG. 3C depicts three-phase branch as in FIG. 3A with additional peripheral units deployed along it, according to some embodiments of the present invention.

Reference is made to FIG. 3C which is a high-level diagram of an exemplary single phase branches 331, 332 of an electrical system according to some embodiments of the present invention. In the embodiment presented in FIG. 3C, a peripheral unit 315 has been added to branch 330 of FIG. 3A, dividing it into two branches 331 and 332. Thus, if a discontinuation occurs, it may be determined based on voltage between the phase wire and the neutral wire as measured by peripheral units 310, 315, 320 if the discontinuation occurred at branch 331, 332 or after peripheral unit 320., e.g., at the load. As used herein, the main board may be considered as the origin point of the electrical system, and the terms 'before' and 'after' as used herein are defined with relation to the origin point. For example, in FIG. 3C peripheral units 310 is connected before peripheral units 315 and peripheral units 320 is connected after peripheral units 315. If a discontinuation exists, it may be determined whether the discontinuation has occurred in branch 331, 332 or after peripheral units 320 (e.g., at the load), based on the voltage readings of peripheral units 310, 315, 320. It may be determined that the fault has occurred after the last peripheral unit that measures mains voltage between the phase wire and the neutral wire, and before the first peripheral unit that measures null voltage between the phase wire and the neutral wire. For Example, the following table presents expected readings of the voltages between the phase wire and the neutral wire, as measured by peripheral units 310, 315, 320, for discontinuation locations 344, 345, 346, 347:

TABLE 1 expected readings of voltages between the phase wire and the neutral wire, as measured by the different peripheral units for different discontinuation locations:

| Discontinuation location | Peripheral units 310 | Peripheral units 315 | Peripheral units 320 |
|---|---|---|---|
| 345 | mains | null | null |
| 346 | mains | mains | null |
| 347 | mains | mains | mains |

Discontinuation in point 347 may be detected if the voltage readings of peripheral units are as suggested in table 1 and there is no current in that branch Similar concept may be applied to determining the location of faults that lead to leakage of current. Specifically, it may be determined that the fault has occurred after the last peripheral unit that measured current difference between the phase wire and the neutral wire, and before the first peripheral unit that measured no current difference between the phase wire and the neutral wire.

Reference is made to FIG. 4 which is a high-level diagram of an exemplary single phase peripheral unit 400 of switched branch 420 according to some embodiments of the present invention. Peripheral unit 400 may be installed at a node 480 of switched branch 420 of an electrical system. Switched branch 420 may be a single phase branch including a phase wire 430, a neutral wire 432 and a ground wire 434. Branch switch 410 may be accessible to a user and may be external or internal to peripheral unit 400. Branch switch 410 may be installed on phase wire 430 and may enable the user to connect and disconnect switched branch 420. According to some embodiments of the present invention, peripheral unit, similar to peripheral unit 100 depicted in FIG. 1 (peripheral unit 100 depicted here with only some of it components) may be installed on switched branch 420 before branch switch 410, e.g., between branch switch 410 and the main board of the electrical system or between branch switch 410 and another node or other peripheral unit of branch 420.

If all the peripheral units installed on branch 420 were located before branch switch 410 with respect to the direction of flow of electrical energy, in case discontinuity was detected, it would be impossible to determine whether the discontinuity is caused by a fault or the branch is disconnected simply because branch switch 410 is in open position. Hence, a second peripheral unit, e.g., peripheral unit 400, may be installed after branch switch 410, e.g., between branch switch 410 and the appliance which is fed by branch 420. Peripheral unit 400 may include current meter 442 for measuring the phase current and voltage meter 450 for measuring the voltage between phase wire 430 and neutral wire 432. Discontinuity in branch 420 may be detected if the voltage measured by the voltage meter 450 is substantially null and the voltage measured by voltage meter 150 of peripheral unit 100 substantially equals mains voltage, and at least one of the voltage and current measured by the peripheral unit 400 indicates that branch switch 410 is in close position. For example, it may be indicated that branch switch 410 is in close position if current meter 442 measures close circuit current, or current above a predetermined threshold.

Processor 470, memory unit 472 and communication module 474 may be similar in structure to processor 170, memory unit 172 and communication module 174 of peripheral unit 100 depicted in FIG. 1. Processor 470 may be configured to collect data from meters 442, 450 and send the data to the central processing unit using communication module 474. The central processing unit may send control commands to switches 160, 62 via communication module 174 (shown in FIG. 1).

In many applications, the appliances themselves are switched. To detect faults at branches that supply power to switched devices, tests should be performed only when the appliance is turned on. This may be done by giving a manual indication to the central processing unit when the appliance is turned on, or by installing a peripheral unit, similar to peripheral unit 400 inside the appliance, or by receiving autonomous indication from the appliance, for example if that appliance has communication capability enabled.

It is noted that the principals of automatically monitoring a switched branch, presented for a single phase line, may be easily adjusted to switched three phase branches, mutatis mutandis. When automatically monitoring switched three phase branches, current may be measured after the branch switch at the three phases, and discontinuity in a phase may be detected if a voltage measured between the phase wire and the neutral wire of the branch after the branch switch is substantially null, and the voltage measured between the same phase wire and the neutral wire before the branch switch substantially equals mains voltage, and the current measured by the current meter of the phase wire after the branch switch substantially equals close circuit current, or is above a predetermined threshold.

Figure 5:
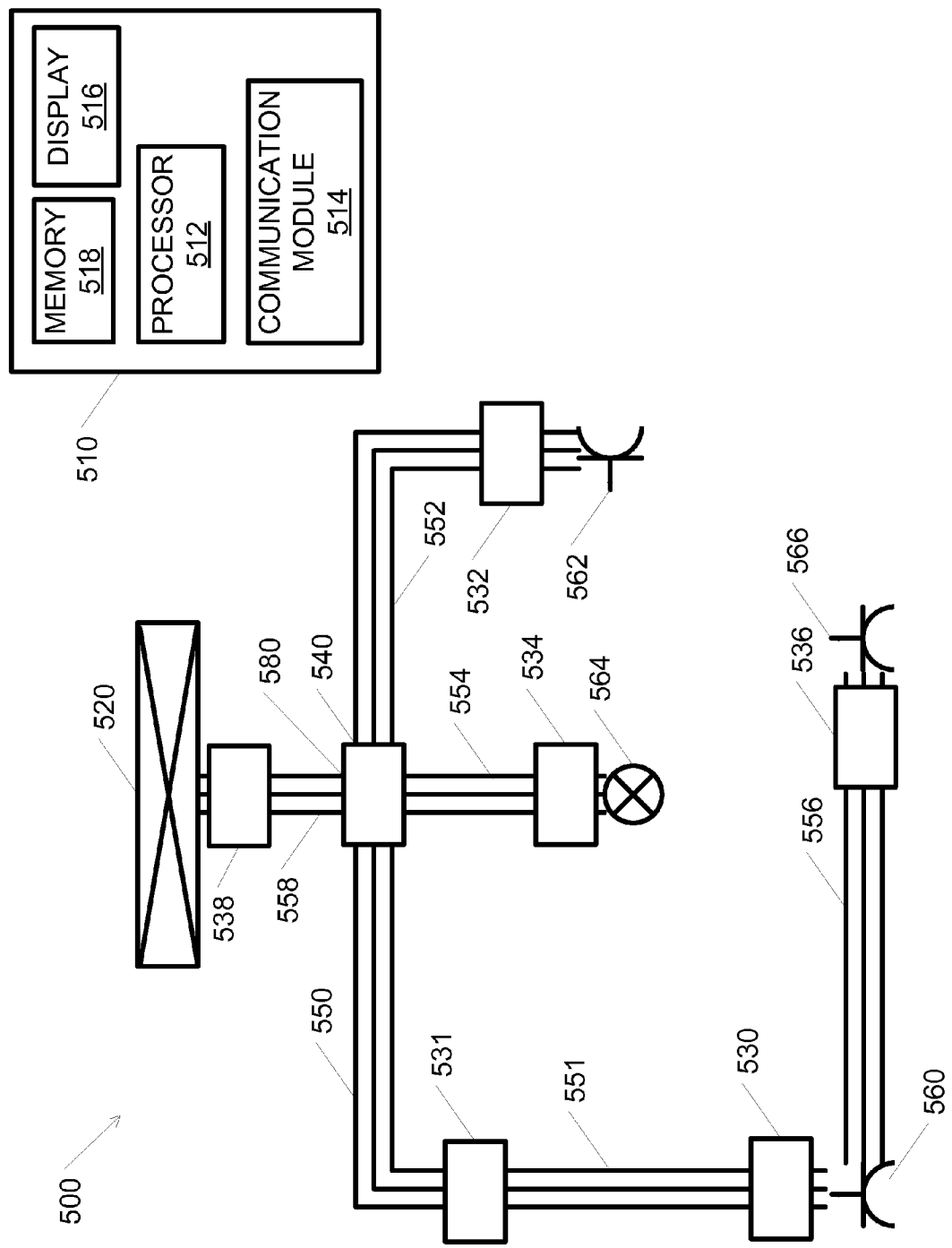
FIG. 5 is a high-level diagram of an exemplary part of electrical system 500 according to some embodiments of the present invention.

Reference is made to FIG. 5 which is a high-level diagram of an exemplary circuit of electrical system 500 according to some embodiments of the present invention. FIG. 5 depicts a single circuit of a home electrical system which may provide power to a room of the house. The exemplary circuit is a single phase circuit. However, electrical system 500 may include other single phase and three phase, switched and not switched, circuits and branches that may be monitored as disclosed herein. The circuit provides power to lamp 564 and to three wall sockets 562, 560 and 566. Peripheral unit 538 may be installed at one end of branch 558, within close physical proximity to main board 520 of the electrical system, or even within main board 520. Peripheral unit 540 may be installed at one the other end of branch 558, at splitting node 580, in which branch 580 splits to branches 552, 554 and 550. Peripheral unit 532 may be installed at the other end of branch 552, within close proximity to inlet 562. Peripheral unit 534 may be installed at the other end of branch 554, within close proximity to lamp 564. Peripheral unit 531 may be installed at the other end of branch 550, which is also a first end of branch 551. Peripheral unit 530 may be installed at the other end of branch 551, which is also a first end of branch 556, within close proximity to inlet 560. Peripheral unit 536 may be installed at the other end of branch 556, within close proximity to inlet 566.

Peripheral units 538, 540, 531, 532, 534, 530, 536 may be generally similar to peripheral unit 100 presented in FIG. 1, or may be slight modifications thereof, as may be required. For example, peripheral unit 540 may optionally include separate current meters for measuring currents of wires of each or some of branches 558, 552, 554, 550, 551 and separate switches for disconnecting each or some of the branches separately.

Central processing unit 510 may include processor 512 and memory unit 518. Processor 512 may be configured to execute commands included in a program, algorithm or code stored in memory 518. Processor 512 may include components such as, but not limited to, one or more central processing units (CPU) or any other suitable multi-purpose or specific processors or controllers, one or more input units, one or more output units or any other suitable hardware components and/or software components. Processor 512 may be any computation device that is configured to execute various operations included in some methods disclosed herein. Memory 518 may be a non-transitory computer-readable storage medium that may store thereon instructions that, when executed by processor 512, cause processor 512 to perform operations and/or methods, for example, the method disclosed herein.

Processor 512 may be configured to collect data from peripheral units 538, 540, 531, 532, 534, 530, 536 through communication module 514. The central processing unit 510 may send control commands to switches of peripheral units 538, 540, 531, 532, 534, 530, 536 through communication module 514. Communication module 514 may communicate with peripheral units 538, 540, 531, 532, 534, 530, 536 through a communication network as disclosed herein.

Faults, such as discontinuities, loose connections, leakage currents, short currents, overload and other faults discussed herein may be detected by analyzing data collected by central processing unit 510 from peripheral units 538, 540, 531, 532, 534, 530, 536, as disclosed herein. For example, central processing unit 510 may analyze data collected from peripheral units 538, 540, 531, 532, 534, 530, 536 to detect faults as disclosed herein. If a fault is detected at a specific branch, central processing unit 510 may command a peripheral unit of that branch, for example, the peripheral unit located at the branch end more proximal to the main board, to disconnect the defected branch, by opening the switches of the phase and neutral wires. Thus, the rest of the circuit may continue to operate. For example, peripheral unit 530 may disconnect branch 556 if a fault is detected at branch 556.

For example, if the voltage measured between a phase wire and the neutral wire of branch 554 at peripheral unit 540 substantially equals mains voltage, and the voltage measured between a phase wire and the neutral wire of branch 554 at peripheral unit 534 is substantially null, discontinuity in branch 554 may be detected, and switches of peripheral unit 540 that provide power to branch 554 may be opened. However, if the voltage measured between a phase wire and the neutral wire of branch 554 at peripheral unit 540 was also substantially null, and the voltage measured between a phase wire and the neutral wire of branch 558 at peripheral unit 538 was substantially mains voltage, then it could be determined that the discontinuity is located somewhere along branch 558 and switches of peripheral unit 358 may be opened. Thus, some embodiments of the present invention may not only enable detection of faults, but may also enable detection of the branches of the circuit in which the fault has occurred. In a similar manner, discontinuity may be detected at branches 554 and 558.

Similarly, in case there is, for example, a short circuit at outlet 566, analysis of the currents measured by peripheral units 538, 540, 531, 532, 534, 530, 536 may reveal that currents have increased prior to disconnection of the circuit at peripheral units 538, 540, 530, 531, 536 and not at peripheral units 532, 534. Thus, central processing unit 510 may disconnect branches 550, 551 and 556 using the switches of peripheral units 530, 531 and 536, while other parts of the circuit, namely branches 552 and 554 may continue to work.

In some embodiments, some of peripheral units 538, 540, 531, 532, 534, 530, 536 may include a source such as source 180 configured to generate current flow at the ground wire of the respective branch. For example, peripheral unit 540 may include source 180 or a plurality of sources configured to generate current flow at ground wires of branches 552, 554, 550 and 556. Currents generated by source or sources 180 may be measured at the respective peripheral units to and the resistance of the ground wire of the respective branches may be calculated based on the measured currents.

Many times, faults in electrical systems evolve gradually, causing small short circuit currents or leakage currents at the beginning, which may increase later on as the system deteriorates. Such faults may occur at various locations in the circuit. Some embodiments of the present application may detect these faults at an early stage and may give indication of the branches at which these faults have occurred.

Continuous voltage measurements between phase wires and neutral wires and between the neutral wire and the ground wire at various locations along the electrical system may enable continues monitoring of voltage quality at various locations of the electrical system. This may enable detection of loose connections that may cause irregular voltage and fire.

According to some embodiments of the present invention, peripheral units 538, 540, 531, 532, 534, 530, 536 may be located at various physical locations of electrical system 500, in addition to or instead of the mechanical circuit breakers and RCD that are typically located at a single and central location, e.g., at the main board. Thus, some embodiments of the present invention provide a distributed system that enables better resolution of faults location. For example, the circuit presented in FIG. 5 would typically be connected to a single circuit breaker at the main board since it is impractical to connect circuit breakers at various locations. Connecting mechanical circuit breakers at various locations is impractical since in case of a fault the user needs to know where to go to examine the circuit breaker's status. However, since peripheral units 538, 540, 531, 532, 534, 530, 536 may communicate with central processing unit 510 that may present data at a single location or send it to other computers or servers for convenient presentation of data to the user, and may control peripheral units 538, 540, 531, 532, 534, 530, 536 to switch their switches to 'on' or 'off' modes from a distance, there is no limitation on distribution of peripheral units 538, 540, 531, 532, 534, 530, 536.

Figure 6:
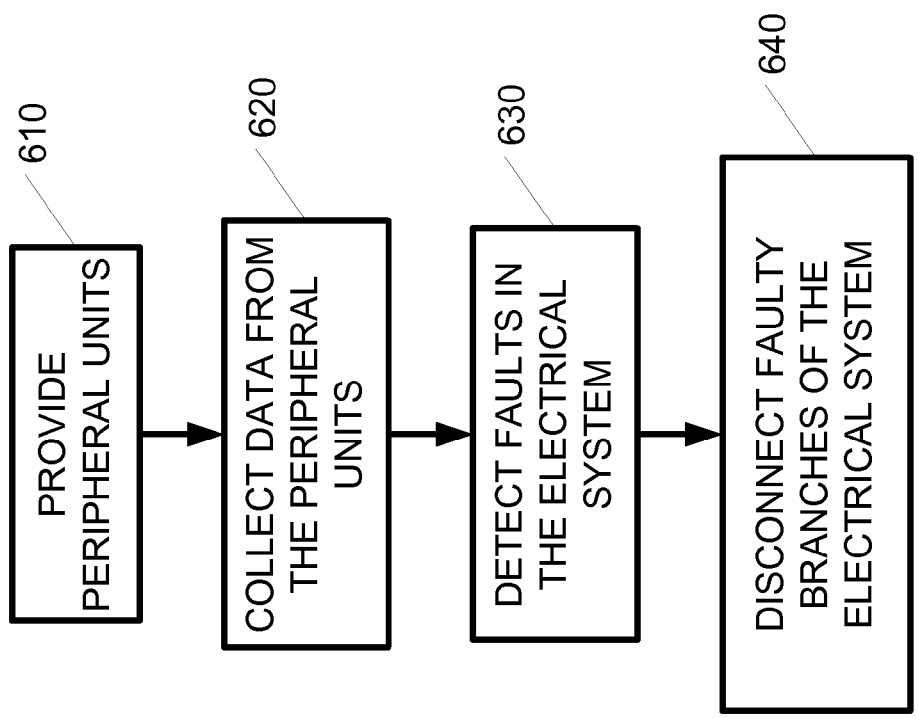
FIG. 6 is a flowchart illustration of a method for monitoring and controlling an electrical network according to some embodiments of the present invention.

Reference is now made to FIG. 6 which is a flowchart illustration of a method for monitoring and controlling an electrical network according to some embodiments of the present invention. At operation 610, peripheral units for measuring branch currents and voltages and optionally controlling the operation of the branches, as disclosed herein, may be provided and installed at various nodes along the branches of the electrical network, each peripheral unit may include at least one current meter or a voltage meter, to measure current of a phase wires, current of the neutral wire, current of the ground wire, voltage between a phase wire and the neutral wire and voltage between the neutral wire and the ground wire, and at least one switch connected to at least one of the phase wires and the neutral wires of at least one branch. In operation 620, data from the peripheral units may be collected. The data may include values of currents and voltages measured by the current meters and voltage meters of the peripheral units. In operation 630, the collected data may be analyzed and faults in the electrical system may be detected based on the analysis of the collected data, as disclosed herein. In operation 640, faulty branches of the electrical system may be disconnected by opening switches of respective peripheral units. It should be noted the disconnecting faulty branches of the electrical system is optional and other actions, or no action at all may be taken, depending on the type of the fault. For example, in case of overload, the branch may remain connected but a warning may be sent to the user.

Some embodiments of the present invention may be implemented in software for execution by a processor-based system, for example, processors 170, 270, 470, 512. For example, some embodiments of the present invention may be implemented in code or software and may be stored on a non-transitory storage medium having stored thereon instructions which, when executed by a processor, cause the processor to perform methods as discussed herein, and can be used to program a system to perform the instructions. The non-transitory storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices. Other implementations of embodiments of the present invention may comprise dedicated, custom, custom made or off the shelf hardware, firmware or a combination thereof.

Some embodiments of the present invention may be realized by a system that may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A system for monitoring and controlling an electrical network, the electrical network comprising branches, each branch comprising at least one phase wire, a neutral wire and a ground wire, and plurality of nodes, the system comprising:
    a plurality of peripheral units installed at various nodes along the branches of the electrical network, each peripheral unit comprising:
        at least one meter selected from a current meter and a voltage meter, to measure at least one of: current of a phase wire, current of the neutral wire, current of the ground wire, current difference between a phase wire and the neutral wire, voltage between a phase wire and the neutral wire and voltage between the neutral wire and the ground wire;
        at least one switch connected to at least one of: the phase wires and the neutral wires of at least one branch; and
    a central processing unit configured to:
        collect data from the at least one meter;
        analyze the data to detect faults at the electrical network; and
        control the at least one switch of the plurality of peripheral units, so as to disconnect faulty branches of the electrical network,
    wherein the at least one branch is a single phase line comprising a phase wire, a neutral wire and a ground wire, and wherein each of the peripheral units comprises:
        three current meters to measure the currents flowing at the phase wire, the neutral wire and the around wire;
        two voltage meters to measure the voltage between the phase wire and the neutral wire and between the neutral wire and the ground wire; and
        two switches, one installed at the phase wire and one at the neutral wire.

2. The system of claim 1, wherein the current meter is a Hall Effect current meter.

3. The system of claim 1,
    wherein the branch is a single phase line comprising a phase wire, a neutral wire and a ground wire, and
    wherein each of the peripheral units comprises:
        a differential current meter to measure the difference between current flowing at the phase wire and the neutral wire;
        a current meter to measure the current flowing at the ground wire;
        two voltage meters to measure the voltage between the phase wire and the neutral wire and between the neutral wire and the ground wire; and
        two switches, one installed at the phase wire and one at the neutral wire.

4. The system of claim 1,
    wherein the branch is a three phase line comprising three phase wires, a neutral wire and a ground wire, and
    wherein each of the peripheral units comprises:
        five current meters to measure the currents flowing at the phase wires, the neutral wire and the ground wire;
        four voltage meters to measure the voltage between each of the phase wires and the neutral wire and between the neutral wire and the ground wire; and
        four switches, one installed at each of the phase wires and one on the neutral wire.

5. The system of claim 1, wherein the peripheral units are installed at locations selected from splitting nodes of the electrical network, branches of the electrical network and at end nodes of the electrical network.

6. The system of claim 1,
    wherein a first peripheral unit is installed at one end of a branch of the electrical network and a second peripheral unit is installed at a second end of the branch, and
    wherein discontinuity in the branch is detected if a voltage measured by the second peripheral unit is substantially null and a voltage measured by the first peripheral unit substantially equals mains voltage.

7. The system of claim 6,
    wherein the branch is switched, and
    wherein a third peripheral unit is installed between the branch switch and an appliance which is fed by the branch, the third peripheral unit comprises at least one of a current meter to measure a current between the branch switch and the appliance and a voltage meter to measure a voltage between a phase wire and a neutral wire of the branch between the branch switch and the appliance, and wherein discontinuity in the branch is detected if the voltage measured by the second peripheral unit is substantially null and the voltage measured by the first peripheral unit is substantially mains voltage, and at least one of the voltage and current measured by the third peripheral unit indicates that the branch switch is in close position.

8. The system of claim 1,
wherein a first peripheral unit is installed at one end of a branch of the electrical network and a second peripheral unit is installed at a second end of the branch,
wherein the first peripheral unit comprises at least one of: a voltage source and a current source, to generate current flow at the ground wire of the branch,
wherein the second peripheral unit to measure the current at the ground wire of the branch, and
wherein resistance of the ground wire is calculated based on the measured current.

9. The system of claim 1,
wherein the peripheral unit comprises current meters to measure currents of each of the phase wires, the neutral wire and the ground wire, and
wherein leakage currents are calculated based on the differences between the currents measured at the phase wires and the currents measured at the neutral wire.

10. The system of claim 1,
wherein the peripheral unit comprises differential current meters to measure current differences between each of the phase wires and the neutral wire, and
wherein leakage currents are calculated based on the current differences.

11. The system of claim 9, wherein quality of insulation of wires of the branch is estimated based on the calculated leakage currents.

12. The system of claim 1,
wherein the peripheral unit comprises current meters for measuring currents of each of the phase wires, the neutral wire and the ground wire, and
wherein short circuit is detected if the current measured at one of the phase wires and at the ground wire exceeds a predetermined threshold.

13. The system of claim 1,
wherein the peripheral unit comprises voltage meters to measure the voltage between each of the phase wires and the neutral wire and between the neutral wire and the ground wire and
wherein loose connections are detected based on the measured voltages.

14. The system of claim 1,
wherein each of the peripheral units comprises a communication module and
herein the central processing unit is configured to communicate with the peripheral units via the communication modules.

15. The system of claim 13, wherein the central processing unit is configured to communicate with the peripheral unit via at least one of a wired communication network, wireless communication network and power-line communication network.

16. The system of claim 1,
wherein the peripheral unit comprises current meters to measure currents of each of the phase wires, and
wherein the system to give overload indication if current in at least one of the phase wires exceeds a predetermined threshold.

* * * * *